United States Patent [19]
Kinanen et al.

[11] Patent Number: 5,329,128
[45] Date of Patent: Jul. 12, 1994

[54] METHOD AND APPARATUS FOR RECORDING INFORMATION FROM A SLIDABLE SHEET OF A RIM CASSETTE

[75] Inventors: Ilmari Kinanen, Espoo; Matti Rantanen, Kirkkonummi; Pertti Sormunen, Vantaa, all of Finland

[73] Assignee: Berggren OY AB, Helsinki, Finland

[21] Appl. No.: 965,414

[22] PCT Filed: Jul. 29, 1991

[86] PCT No.: PCT/FI91/00230
  § 371 Date: Dec. 29, 1992
  § 102(e) Date: Dec. 29, 1992

[87] PCT Pub. No.: WO92/02849
  PCT Pub. Date: Feb. 20, 1992

[51] Int. Cl.⁵ .............................. G03B 42/02
[52] U.S. Cl. ........................ 250/584; 250/588
[58] Field of Search ............... 250/588, 582, 581

[56] References Cited
U.S. PATENT DOCUMENTS

| | | |
|---|---|---|
| 4,750,045 | 6/1988 | Ohara et al. .................. 358/285 |
| 4,810,874 | 3/1989 | Torii . |
| 4,835,386 | 5/1989 | Shimura et al. ............... 250/484.4 |
| 4,908,514 | 3/1990 | Bauer et al. . |
| 5,138,160 | 8/1992 | Shimizu et al. ............... 250/484.4 |

Primary Examiner—Paul M. Dzierzynski
Assistant Examiner—Richard Hanig
Attorney, Agent, or Firm—Christopher C. Dunham

[57] ABSTRACT

A method and apparatus for recording the information from the slidable sheet (5) of a RIM cassette (2). The information included on the sheet, used especially in X-ray photography, is read from the sheet surface drawn out of the cassette with the aid of a laser beam focused on it, after which the sheet is emptied of information with the aid of a powerful light and returned to the cassette. According to the invention, the reading is effected during the linear withdrawal of the slidable sheet (5) in the reading position (9) past which the sheet surface including the information is guided, and the removal of the information is effected during the linear return travel of the slidable sheet in the emptying position (10) past which the sheet surface travels while the sheet is being pushed back into the cassette (2). The movement of the slidable sheet (5) can be effected by a pulling device which consists of a slide (8) travelling on a rotatable shaft (7) and the movement of the slide is effected with the aid of ball bearings mounted against the shaft at a pitch angle. The reciprocating path of the slide (8) is preferably adjusted so that the slidable sheet (5) comes only partially out of the cassette (2) which thus continuously acts as a guide for the sheet.

8 Claims, 4 Drawing Sheets

METHOD AND APPARATUS FOR RECORDING INFORMATION FROM A SLIDABLE SHEET OF A RIM CASSETTE

BACKGROUND OF THE INVENTION

The object of this invention is a method and apparatus for recording information from a slidable sheet of a reusable image media (RIM) cassette, in which the information on the sheet surface drawn out of the cassette is read with the aid of a beam directed on it and the sheet is emptied of information after the reading and returned to the cassette.

There are materials which have the ability to be tuned by the effects of radiation, such as x-ray, ultraviolet or gamma radiation directed on them. The absorbable radiation energy may include information which can be read with the aid of secondary radiation, such as a laser beam on the visible light region which is directed onto the material, by recovering the light emitted from the material and by converting it to an image. This RIM technique is based on x-ray photography in which radiation, conducted through the photographed object and modified by the absorption which occurs in the object, is focused on a layer of phosphor on the sheet which is to be excited. The phosphor layer records the information included in the beam and the sheet which is exposed in this way is read by a laser beam in order to form an image on a light multiplier or film.

It is possible to form the X-ray image directly with the aid of a reading head for the sheets connected to and in conjunction with the photographing device. On the other hand, it is possible to enclose the sheet in the cassette after the exposure and to carry out the reading later by a separate reading device. The latter technique, which the present invention relates to, is more flexible because the reading of the sheet enclosed in the cassette is not bound by time or place to the photographing procedure.

The reading of the sheet in the cassette has so far been effected in such a way that the sheet has been drawn out of the cassette onto a belt conveyor and the information on the sheet has been read in the reading position with the conveyor moving. In order to achieve a successful reading, the linear movement of the conveyor must be as smooth as possible. After the reading, the sheet has been emptied of information with the aid of a powerful light on the path of the conveyor in a subsequent emptying position. After the emptying the sheet has been returned to the cassette to wait for the next operation.

SUMMARY OF THE INVENTION

The purpose of this invention is to establish a novel solution in order to enhance the reading of the information on the slidable sheet in the cassette and the subsequent removal of the information from the sheet. The invention is characterized in that the reading is carried out, during the linear drawing out of the slidable sheet, in the reading position past which the sheet surface containing the information is guided, and that the removal of the information is carried out, during the linear return travel of the slidable sheet, in the emptying position past which the sheet surface passes when the sheet is being pushed back into the cassette.

In the solution according to the invention, the reading of the information on the slidable sheet can be initiated immediately after the end of the sheet has come out of the cassette, in contrast to the known technique where the sheet has first been transferred to the conveyor belt. Due to this improvement, the reading of the sheet is essentially speeded up. According to the invention, the sheet makes a simple reciprocating movement with respect to the cassette during which the emptying of the information from the sheet is carried out in addition to the reading of the sheet.

In the solution according to the invention, the movement of the slidable sheet with respect to the cassette and the reading and emptying positions of the sheet is essential. This is simply carried out in such a way that the cassette is held in place and the sheet is arranged, during its reciprocating movement, to travel past the stationary reading and emptying positions. The movement of the sheet can thus be effected by a pulling device which engages the end of the sheet and moves linearly back and forth.

According to the invention it is preferred to arrange the reciprocating movement of the slidable sheet in such a way that the sheet only partly comes out of the cassette during the movement. Thus the cassette continuously acts as a guide for the slidable sheet and no separate control for taking the sheet back to the cassette is required.

It is also an object of the invention to provide a device for reading and recording the information on the slidable sheet of the RIM cassette by the above method. The device according to the invention comprises a housing equipped with a light-shield for receiving the cassette; an extension space for the housing into which the slidable sheet of the cassette can be drawn; a pulling device traveling back and forth in the space by which the slidable sheet can be linearly drawn out of the cassette and pulled back into it; and members which are placed on the side of the reciprocating path of the slidable sheet for reading the information on the surface of the sheet in the reading position and for the removal of the information that has been read from the sheet in the emptying position.

The housing can, in the device according to the invention, be comprised of a cavity inside which the cassette can be fitted partly or fully and the mouth of which is provided with a light-impermeable closure. In case the cassette only goes partly inside the cavity, the closure can be formed of strips, ridges or similar members which are pressed against the sides of the cassette. In case the entire cassette goes into the cavity, the closure preferably consists of a cover which closes the cavity. It is essential that the closure prevents any outside light from going into the space where the reading and emptying of the slidable sheet takes place.

The reading and emptying positions of the information on the slidable sheet advantageously lie adjacent on the front portion of the reciprocating path of the sheet, preferably as close as possible to the end of the space by which the slidable sheet comes out of the cassette. Thus the lengths of the movements required for the reading and the emptying of the sheet are the same and the length of the path of the sheet remains as short as possible.

The pulling device which propels the slidable sheet can be, according to the invention, comprised of a slide mounted on a smooth shaft rotatable in opposite directions, with the slide traveling linearly on the shaft with the aid of pitched bearings placed against the shaft. The slide is provided with at least one guide which prevents the slide from rotating with the shaft. With the shaft manufactured and ground to precise tolerances, a linear movement of the slidable sheet is achieved by this solution which is sufficiently smooth as regards the reading of the sheet. The accuracy of the movement is not dependent on the guide but only on the manufacturing precision and the bearings of the rotating shaft.

The engagement between the pulling device and the end of the slidable sheet can be arranged, in the device according to the invention, simply with the aid of, for instance, a magnet included in the pulling device. In addition, the slidable sheet can be locked to the body of the pulling device.

BRIEF DESCRIPTION OF THE DRAWINGS

In the following the invention is described in more detail with the aid of examples and by reference to the appended drawings, where.

DESCRIPTION OF THE PREFERRED EMBODIMENTS

Figure 1:
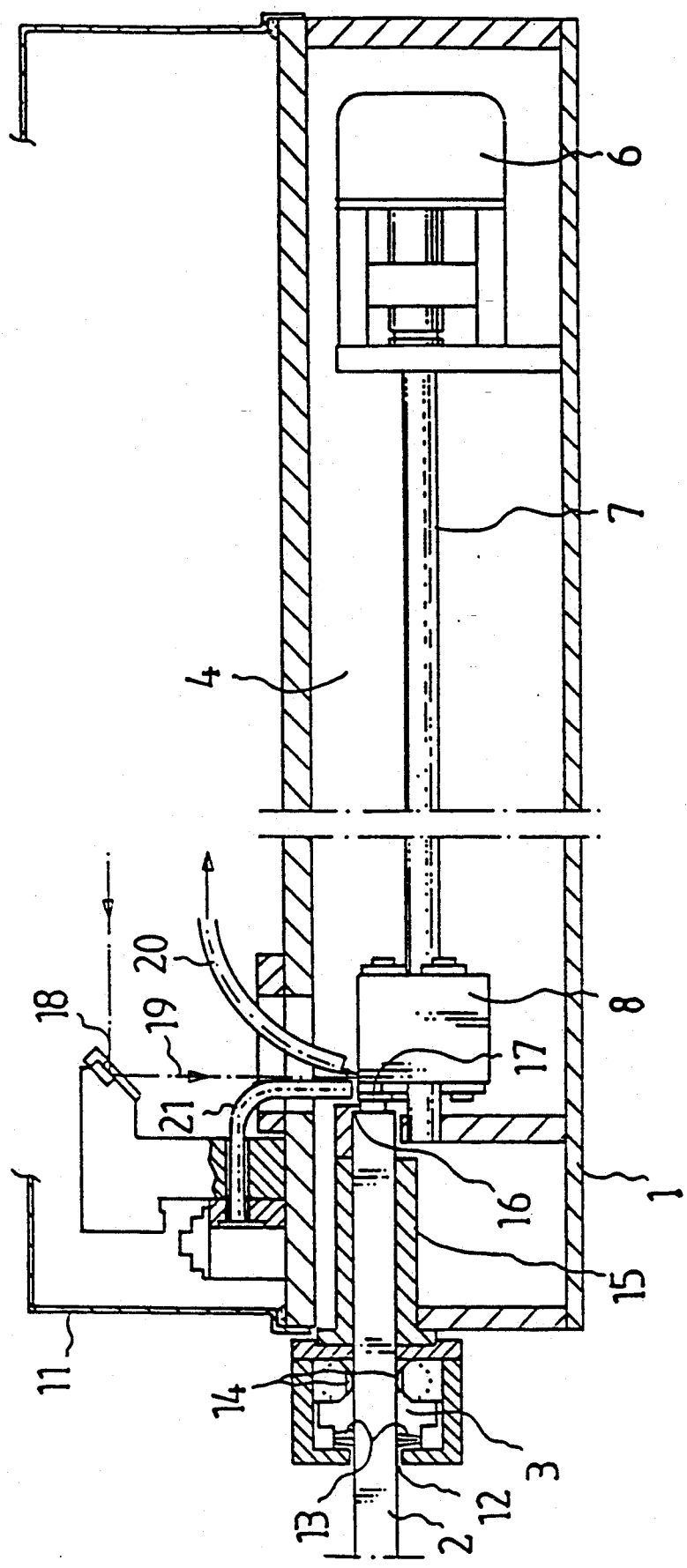
FIG. 1 shows a device according to the invention for the reading of information on a slidable sheet of a RIM cassette and the subsequent removal of the information, in which the sheet is inside the cassette and the slide which transfers the sheet linearly is in its initial position.
Figure 2:
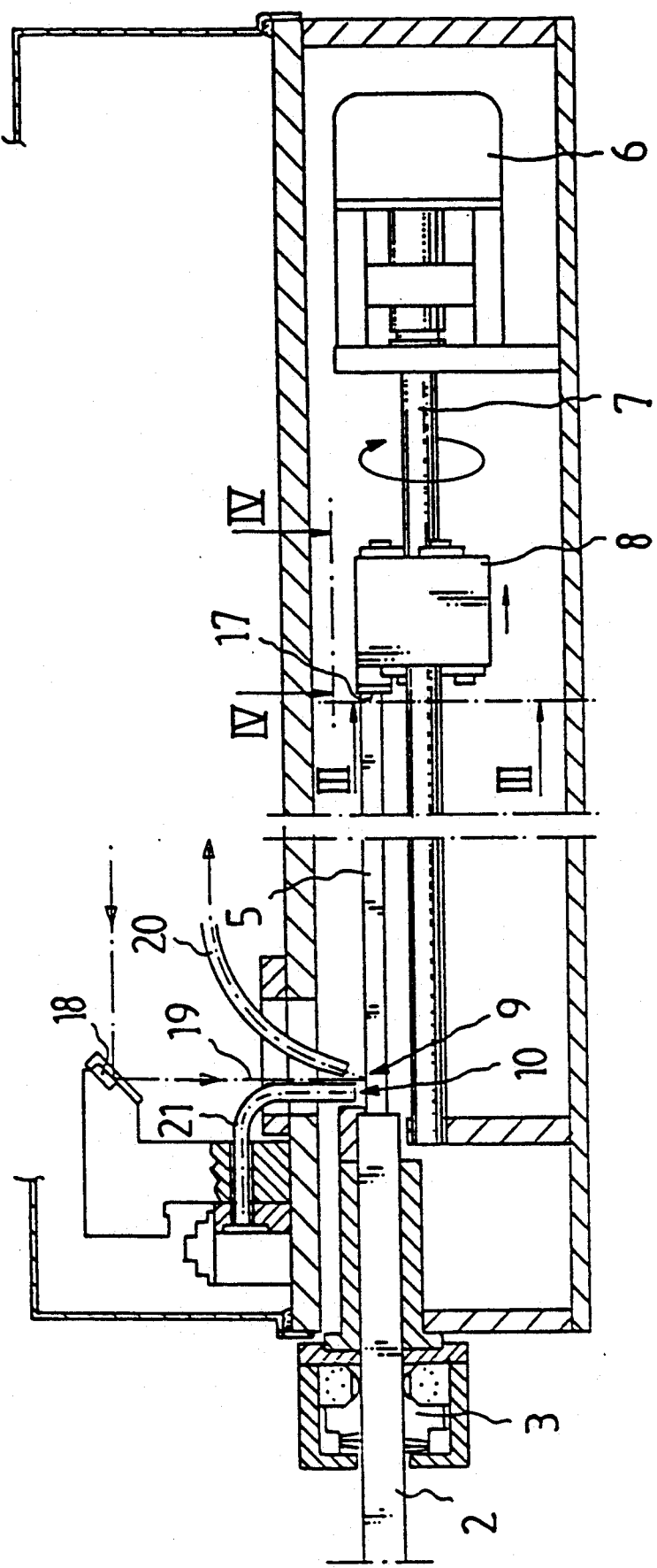
FIG. 2 shows the reading of the sheet in the device according to FIG. 1 with the sheet mainly drawn out.

The device shown in FIGS. 1 and 2 comprises, as its main parts, body 1, cavity 3 which receives RIM cassette 2, extension space 4 of the cavity where slidable sheet 5 contained in the cassette carries out the reciprocating movement, pulled by slide 8 driven with the intermediary of shaft rod 7 of stepping motor 6 which rotates around its own axle, reading and emptying positions 9, 10 for the information contained on the sheet which are situated on the reciprocating path of the slidable sheet, with the associated members and protective casing 11.

Cavity 3 which receives cassette 2 includes entrance opening 12, ridges 13 situated immediately behind the opening and pressed against the sides of the cassette which prevent the outside light from getting further into the cavity and space 4 behind it, guides 14 which lie against the sides of the cassette and cassette holder 15 with shoulder 16 at the end thereof. Cassette 2 can be pushed, according to FIGS. 1 and 2, through cavity 3 up to said shoulder 16, whereby a portion of the cassette remains outside the cavity.

Slide 8 which propels slidable sheet 5 is provided with magnet 17 with which the slide engages the end of the slidable sheet inside cassette 2, in the position according to FIG. 1. In FIG. 2, shaft rod 7 rotated by stepping motor 6 has transferred slide 8 near the opposite end of space 4 with respect to cassette cavity 3, whereby slidable sheet 5 has been mainly drawn out of cassette 2. After slide 8 and slidable sheet 5 have reached the extreme end of their paths, the direction of rotation of shaft rod 7 is reversed, whereby slide 8 returns to the position according to FIG. 1, pushing slidable sheet 5 back into cassette 2.

In X-ray photography the reading of the information recorded on the phosphor surface of slidable sheet 5 is effected, in the shown device, in reading position 9 during the withdrawal of the sheet. The device includes mirror 18 which guides laser beam 19 of a wavelength of visible light in a reciprocating movement across the surface of the sheet and the light emitted from the surface is conducted along light-conducting member 20 to a light-multiplier (not shown). The emptying of slidable sheet 5 of information which has been read is effected during the return travel of the sheet in emptying position 10, where a powerful emptying light is conducted on the surface of the sheet by light-conducting member 21. Slidable sheet 5 which has been returned to cassette 2 is thus ready for a new exposure in the following X-ray photography.

Figure 3:
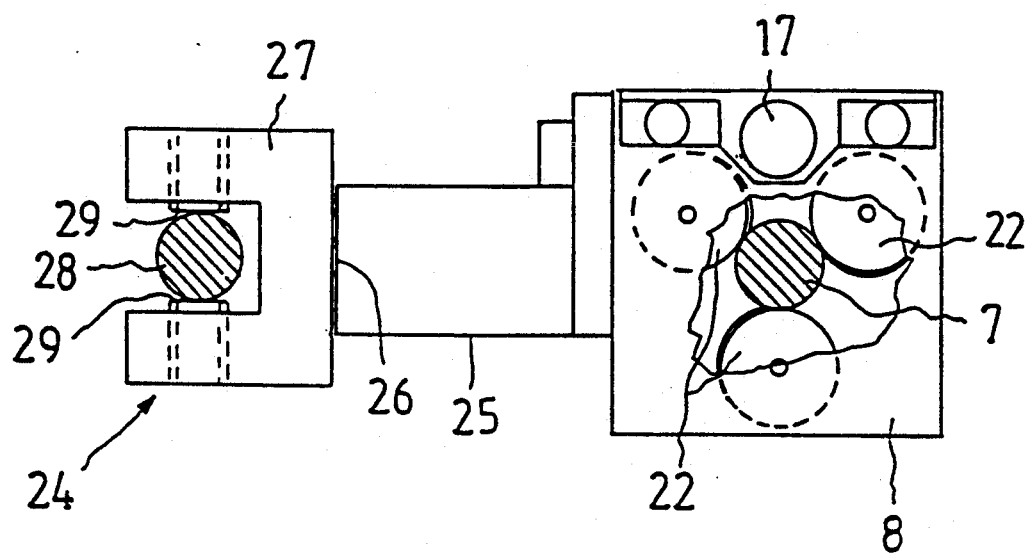
FIG. 3 shows the sheet-propelling slide and the associated guide as a section III—III of FIG. 2.
Figure 4:
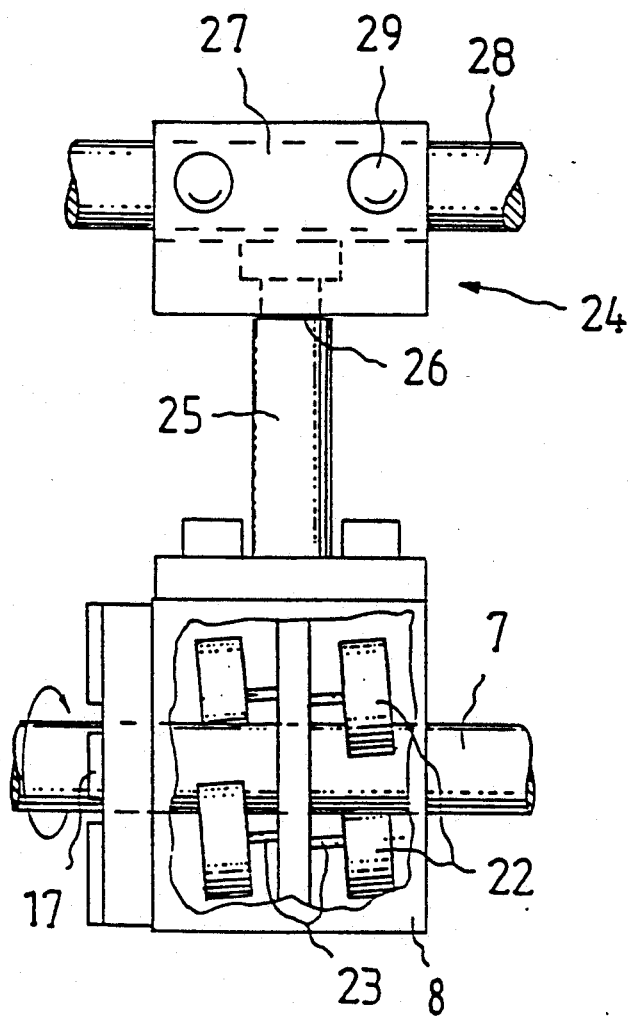
FIG. 4 shows the slide and the guide as viewed from the top (in direction IV—IV of FIG. 2) and partly in section.

FIGS. 3 and 4 show a mechanism which propels slide 8 drawing the slidable sheet on shaft rod 7. Slide 8 is provided with six ball bearings 22 inclined at a pitch angle which are arranged against shaft rod 7 on two groups of three parallel bearings. The rotation of rod 7 around its longitudinal axis brings bearings 22 which are against the rod into a rotating movement, and because the direction of shafts 23 of the bearings slightly deviates from the direction of rod 7, this results in the bearings forcing the slide into a linear movement along the rod which analogically corresponds to a movement of a nut on a screw thread.

In order for the slide to move in a desired way, linearly along shaft rod 7 without rotating with the rod, the slide is provided with guide 24 comprised of lug 25 attached to the slide, fork portion 27 connected to the lug with flexible link 26 and a stationary conducting rod 28. Fork portion 27 is provided with four screws 29 which contact conducting rod 28 in a spotlike manner at the tips thereof and which are of nylon or teflon. Guide 24 has no effect on the smoothness of the linear movement of the slide but the smoothness is only dependent on the soundness and bearings of shaft rod 7.

Figure 5A:
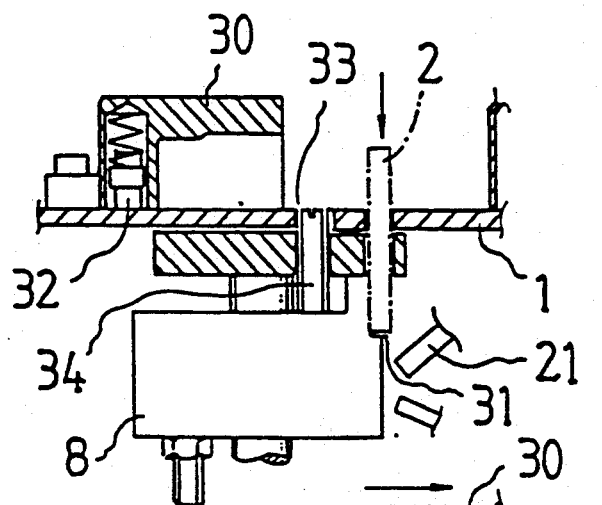
FIGS. 5a-5c show a gradual recovery of information from the slidable sheet of the RIM cassette by using another device according to the invention.
Figure 5B:
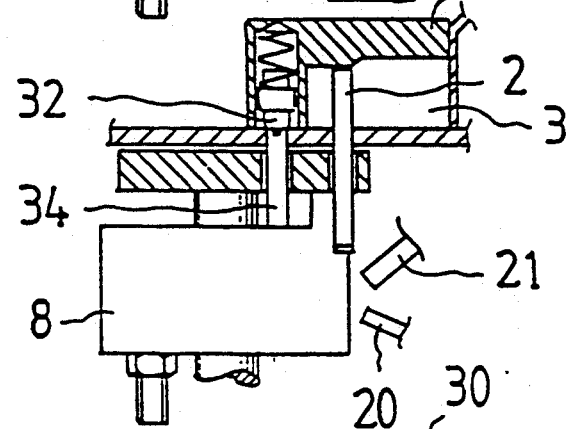
Figure 5C:
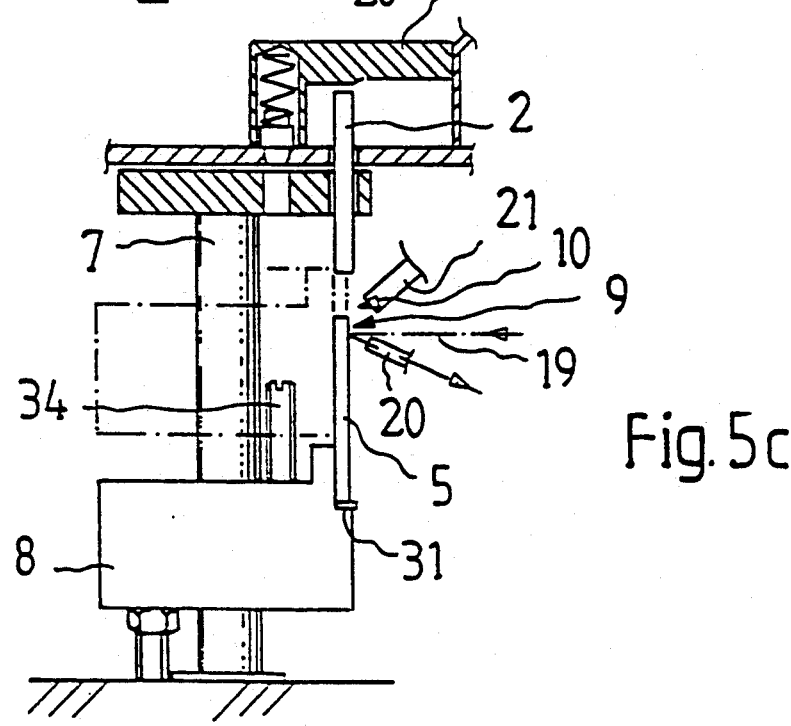

The device for the reading and emptying of slidable sheet 5 of RIM cassette 2 of information, shown in FIGS. 5a, 5b and 5c, corresponds to a great extent to the one illustrated in FIGS. 1 and 2. However, the difference is that cassette 2 is placed into the cavity in space 3 which can be closed by cover 30 in such a way that the entire cassette remains inside the cover and that the reciprocating movement of slidable sheet 5 is effected in a vertical direction. In FIG. 5, cassette 2 is pushed into a hole made for it in body 1 of the device in such a way that the cassette extends to shoulder 31 in reciprocating slide 8 which is provided with a magnet. In FIG. 5b cover 30 travelling in a tangential direction is transferred against cassette 2 in such a way that the entire cassette remains inside the cover. Pin 32 included in cover 30 and loaded by a spring is thus against opening 33 formed in the body, and against the head of rod 34 in the hole which is included in slide 8, and the cover prevents the light from outside from entering into space 3 under the cover and into reading and emptying positions 9, 10 of the sheet behind it.

When slide 8 starts moving from the initial position according to FIG. 5b, rod 34 included in the slide retracts from opening 33 in the body and pin 32 included in cover 30 is pushed by the spring into the opening locking the cover finally in place. The magnet included in slide 8 pulls slidable sheet 5 out of cassette 2 and the reading of the sheet is effected with the aid of laser beam 19 in reading position 9 as described above. In FIG. 5c slide 8 and slidable sheet 5 have arrived at the end of their paths where entire slidable sheet 5 is outside cassette 2, and after this the returning is effected to the position according to FIG. 5b during which the sheet is emptied of information in emptying position 10 as described above Cover 30 is finally opened according to FIG. 5a for the removal of cassette 2 and for the placing of a new cassette including a sheet to be read and emptied subsequently.

It is clear to those skilled in the art that different applications of the invention are not limited to the above examples, but can vary within the appended claims. Thus in FIGS. 5a-5c the reciprocating path of slide 8 and slidable sheet 5 can be adjusted so that slidable sheet 5 does not entirely come out of cassette 2 but remains, even in its extreme position, partly inside the cassette. The control of the movement of slide 8 is further possible to arrange in another way than with the aid of guide 24 shown in FIGS. 3 and 4. It is, for instance, possible to place slide 8 in a slide groove which is parallel with shaft rod 7 and support it there with nylon or teflon screws which contact the groove in a spotlike manner, whereby the arrangement prevents the slide from rotating and thus forces it into a linear movement.

We claim:

1. A method for reading the information on a tuned slidable sheet of a reusable image media cassette with the use of a separate reading device comprising the steps of:
    inserting a cassette with a tuned slidable sheet into a casing in a reading device;
    engaging one end of said slidable sheet to a pulling device travelling linearly back and forth;
    moving said slidable sheet with said pulling device to draw said slidable sheet out of said cassette in a direction of movement;
    focusing a light beam on said slidable sheet at a stationary reading position on a path of travel of said slidable sheet, said light beam reading information from said sliding sheet;
    reversing the direction of movement of said slidable sheet and returning said slidable sheet back into said cassette; and
    emptying said slidable sheet of the information during its return movement at a stationary emptying position on the path of travel of said slidable sheet.

2. The method according to claim 1, wherein said slidable sheet is pulled in such a way that it only partially comes out of the cassette.

3. The method according to claim 1 or 2, wherein the information is read by focusing a laser beam on said slidable sheet and by conducting light emitted from said slidable sheet by the effect of the laser beam into a detector.

4. A device for reading information from a tuned slidable sheet of a reusable image media cassette comprising:
    a casing equipped with a light-shield for receiving a cassette with a tuned slidable sheet enclosed therein;
    an extension space for the casing into which the slidable sheet in the cassette can be drawn;
    a pulling device engaging an end of the slidable sheet and reciprocating in said extension space by which the slidable sheet can be drawn linearly out of the cassette and pushed back in; and
    members placed on a side of a reciprocating path of the slidable sheet for reading of information on said slidable sheet in a reading position and for removal of the information which has been read from said slidable sheet in an emptying position.

5. The apparatus according to claim 4, wherein said casing is formed by a cavity inside of which the cassette can be fitted fully or partially and a mouth of which is equipped with a closure impermeable to light.

6. The apparatus according to claim 4 or 5, wherein the reading and emptying positions of the information are situated adjacent to each other in a front portion of the reciprocating path of the slidable sheet close to an end of said extension space from which the slidable sheet comes out of the cassette.

7. The apparatus according to any one of claims 4 or 5, wherein said pulling device consists of a slide mounted on a smooth shaft rotatable in opposite directions, said slide moving linearly on the shaft with the aid of bearings lying against the shaft and placed at a pitch angle and is provided with a guide which prevents the slide from rotating with the shaft.

8. The apparatus according to any one of claims 4 or 5, wherein said pulling device comprises a magnet forming an engagement member which is attached to an end of the slidable sheet.

* * * * *